April 17, 1934.   W. P. BOWDRY, JR   1,955,222
GATE VALVE
Filed Feb. 10, 1933   2 Sheets-Sheet 1

Inventor
William P. Bowdry, Jr.

By Jack A. Ashley
Attorney

April 17, 1934.  W. P. BOWDRY, JR  1,955,222
GATE VALVE
Filed Feb. 10, 1933  2 Sheets-Sheet 2

Inventor
William P. Bowdry, Jr.
By Jack A. Ochley
Attorney

Patented Apr. 17, 1934

1,955,222

UNITED STATES PATENT OFFICE 1,955,222

GATE VALVE

William P. Bowdry, Jr., Dallas, Tex., assignor to Dallas Foundry, Dallas, Tex., a corporation of Texas Application February 10, 1933, Serial No. 656,136

3 Claims. (Cl. 70—124)

This invention relates to new and useful improvements in gate valves.

One object of the invention is to provide an improved gate valve for underground pipe lines arranged to be opened and closed from the surfaces and locked in either position by a surface lock.

A particular object of the invention is to provide an improved gate valve arranged to be connected in an underground pipe line as a regular section thereof, and having a valve stem extending through and above the box, the valve being so arranged that it may be readily opened and closed and so locked from the surface of the ground.

A further object of the invention is to provide a gate valve wherein the valve may be placed the necessary distance underground, with the keyhole of the lock readily accessible from the surface of the ground, and thereby protecting the valve from any jars or blows which may cause a break in the pipe line wherein the valve is connected.

Still another object of the invention is to provide a gate valve and lock of a simple and rugged nature in which all but a few of the parts may be cast and produced at a low cost.

A further object of the invention is to provide a gate valve wherein the gate is locked in either its closed or open position by means so arranged that the key of the lock can not be removed unless the gate is locked in one of said positions, thus assuring the locking of said gate.

A construction designed to carry out the invention will be hereinafter described, together with other features of the invention.

Figure 1:
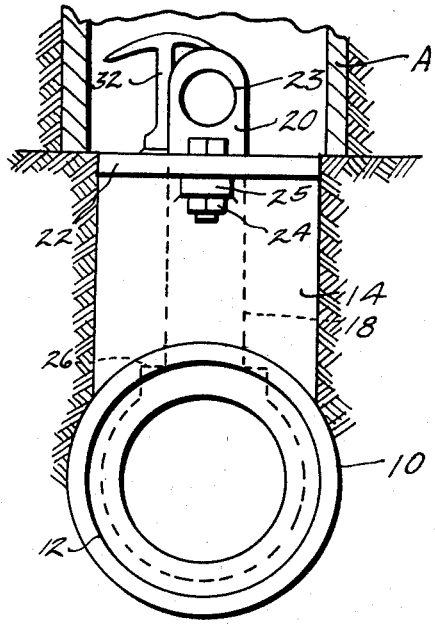
Figure 2:
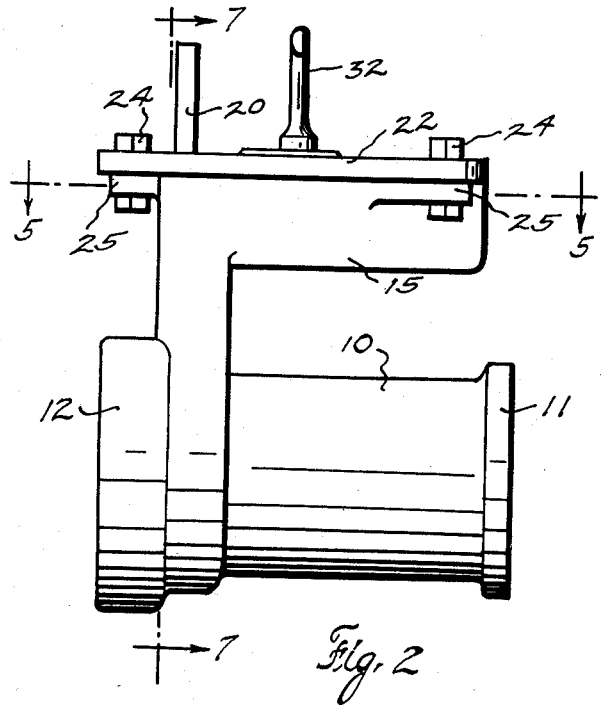
Figure 3:
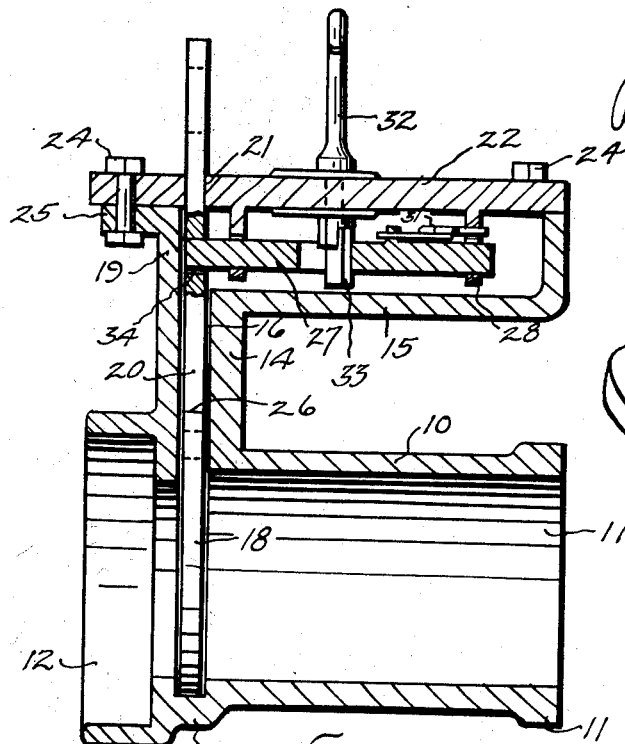
Figure 8:
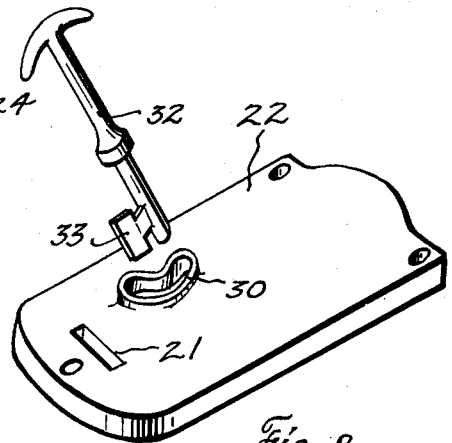
Figure 5:
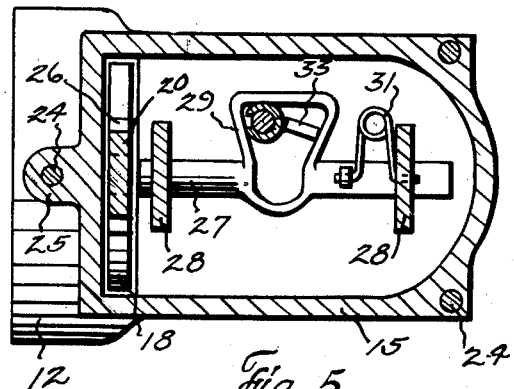
Figure 6:
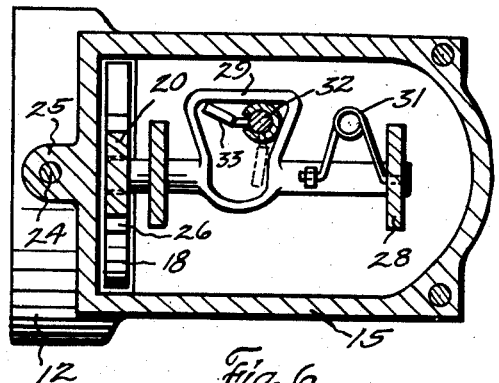
Figure 4:
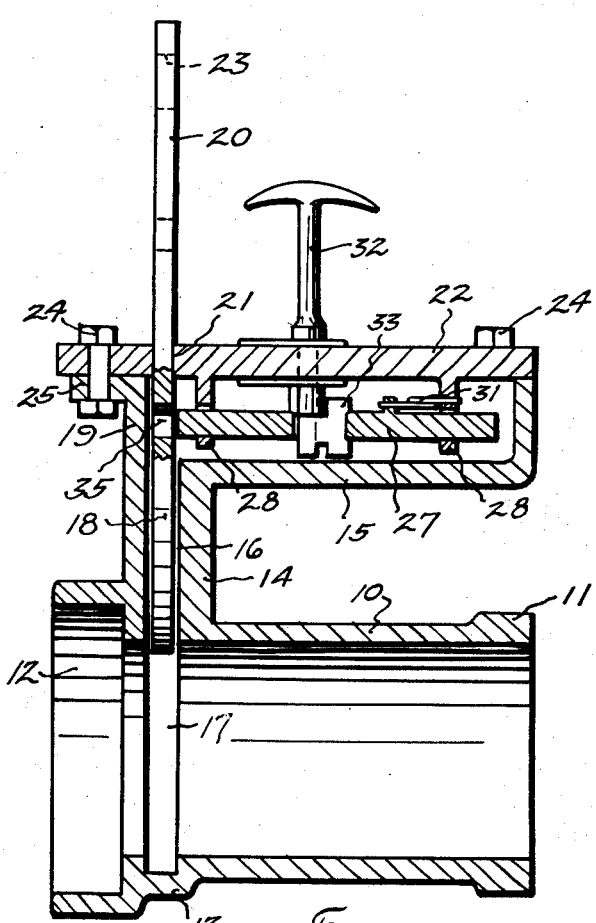
Figure 7:
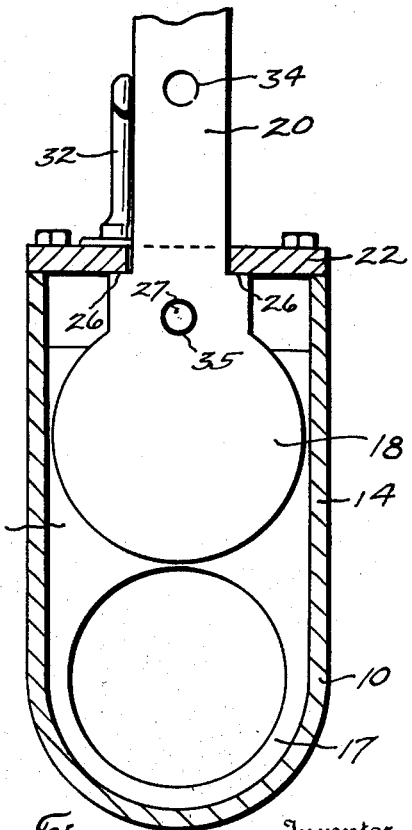

The invention will be more readily understood from a reading of the following specification and by reference to the accompanying drawings in which an example of the invention is shown, and wherein:

Figure 1 is a front elevation of a gate valve constructed in accordance with the invention, Figure 2 is a side elevation of the same, Figure 3 is an enlarged longitudinal vertical sectional view of the same, the gate being closed and locked, Figure 4 is a similar view, the gate being opened and unlocked, Figure 5 is a horizontal cross-sectional view taken on the line 5—5 of Figure 2, but the gate being unlocked, Figure 6 is a similar view, the gate being locked, Figure 7 is an enlarged transverse sectional view taken on the line 7—7 of Figure 2, the gate being open, and Figure 8 is a perspective view of the box cover and key.

In the drawings the numeral 10 designates a pipe section or member having a spigot 11 at one end and a bell 12 at the opposite end, so that it may be connected in a line or string of pipe in the usual manner. The pipe section is made of metal and preferably cast. At the rear of the bell the section is formed with a U-shaped boss 13 which is merged into an upright shank or sleeve 14.

The shank supports the front end of a lock box 15 which overhangs the section 10 and is disposed horizontally. The length of the shank determines the distance at which the box is elevated above the section. The shank is preferably rectangular in cross-section, but this is not essential. The shank is hollow and forms an upright transverse vertical guide 16 which registers with a groove 17 in the boss for receiving a circular gate 18. This gate having a diameter greater than the diameter of the bore of the section, will when in said groove, close or shut off the section.

The front wall 19 of the shank forms one end of the box 15 and the guide 16 opens at its upper end into the bottom of said box at this point. The gate has a flat stem 20 extending upwardly through the guide and box, as well as through a slot 21 in the cover 22 of said box. The upper end of the stem projects above the cover when the gate is opened or closed and has an eye 23 therein, by which it may be grasped by a suitable tool (not shown). The cover is fastened on the box by bolts 24 passing through ears 25 on the box and front wall 19. The gate has shoulders 26 at the bottom of the stem which engage the cover to limit the upward movement of the stem and gate.

In the box a locking bolt 27 is longitudinally slidable in ears 28 depending from the underside of the cover. This bolt has a loop 29 at its central portion and underlies a key-hole 30 in the cover. A U-spring 31 has one leg fastened to the bolt and the other leg secured to the rear ear 28.

One of the features of the invention is that the valve can not be left unlocked. A key 32 having a grooved wing 33, curved to fit the keyhole 30, is passed downwardly therethrough into the loop 29, as is shown in Figure 6. When the key is swung to the dotted position, also shown in Figure 6, it engages the rear wall of the loop and continued swinging displaces the bolt 27, as is shown in Figure 5, whereby the gate is unlocked. The wing 33 will underlie the cover of the box and, therefore, can not be withdrawn until the bolt 27 is again moved forwardly to its locking position, as shown in Figure 6.

The stem 20 of the gate is provided with apertures 34 and 35. When the stem is lowered to close the gate, as in Figures 1, 2, 3 and 6, the aperture 34 will be in the path of the bolt 27 and will receive the same as is shown. By inserting the key 32 in the keyhole 30 and turning the wing 33 in the loop toward the rear of the box, the bolt 27 will be slid rearwardly from its locked to its unlocked position, as is shown in Figures 5 and 6. The key will hold the bolt, as is shown in Figure 5, and the stem 20 may then be raised until the shoulders 26 engage the underside of the cover 22. This will open the gate and position the aperture 35 in the path of the bolt, as is shown in Figure 4. Then by rotating the key forwardly, the spring 31 will assist the key in sliding the bolt into the aperture 35 and thus locking the gate in its open position. The key may be removed when the gate is locked in either position, but it can not be removed when the gate is unlocked.

It will be seen that the gate may be locked either closed or opened, and cannot be moved from one position to the other without being first unlocked. The section 10 is connected in the underground pipe and the depth at which the valve is positioned below the ground depends on the depth of the pipe line which may vary anywhere from three to twelve feet. The valve can be made a standard height and by varying the length of the key 32, the valves set at different elevations may be operated. It is noted that the top of the valve is at all times below the surface of the ground, thereby eliminating the possibility of the valve receiving a jar which would cause a break in the pipe line. A suitable casing A can extend upwardly (Figure 1) from the top of said valve to the surface of the ground and thereby prevent dirt from falling on top of said valve to close the keyhole.

Of course, instead of varying the length of the key 32, a standard size key could be provided and the shank 14 could be lengthened to elevate the box 15 closer to the surface of the ground, according to how deep the particular pipe line may be.

The valve has numerous advantages. The cover of the box is readily accessible and makes the insertion of the key and the locking operation easy and positive. The retaining of the key in the box when the bolt is withdrawn from the stem is advantageous and prevents leaving the valve unlocked. The casting of the section, shank and box in one piece makes for sturdiness and inexpensive production. The particular lock structure is unimportant so long as it functions in the manner herein set forth.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A pipe line locking device comprising, a longitudinal pipe section, a horizontal lock box elevated a substantial distance above the section and overhanging the same, a gate slidable transversely of the section, a stem extending vertically from the gate into the box and movable vertically of the box for raising and lowering the gate, a locking member in the box engaging the stem, and a horizontal cover on said box, the stem extending through and above the cover.

2. A pipe line locking device comprising, a longitudinal pipe section for connecting in a pipe line, said secton having a transverse groove, a hollow shank extending upwardly from the section above the groove, a gate slidable in the shank and engaging the groove of said section, a box mounted on the upper end of the shank a substantial distance above the section and extending horizontally, the shank being integral with the section and box, a cover on the box, a stem extending from the gate through the box and its cover, and a locking member in the box for engaging the stem.

3. A pipe line locking device comprising, a longitudinal pipe section for connecting in a pipe line, said section having a transverse groove, a hollow shank extending upwardly from the section above the groove, a gate slidable in the shank and engaging the groove of said section, a box mounted on the upper end of the shank a substantial distance above the section and extending horizontally, the shank being integral with the section and box, a cover on the box, a stem extending from the gate through the box and its cover, a locking member in the box for engaging the stem, and shoulders at the lower portion of the stem engaging the underside of the cover to limit the upward movement of the gate.

WILLIAM P. BOWDRY, Jr.